Feb. 5, 1929.
H. O. HEM
OVERHEAD TRACK SCALE
Filed Feb. 14, 1923      2 Sheets-Sheet 1
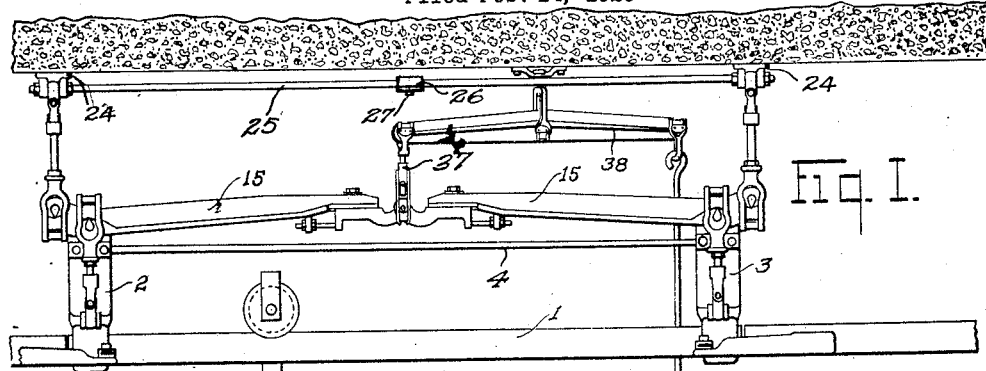
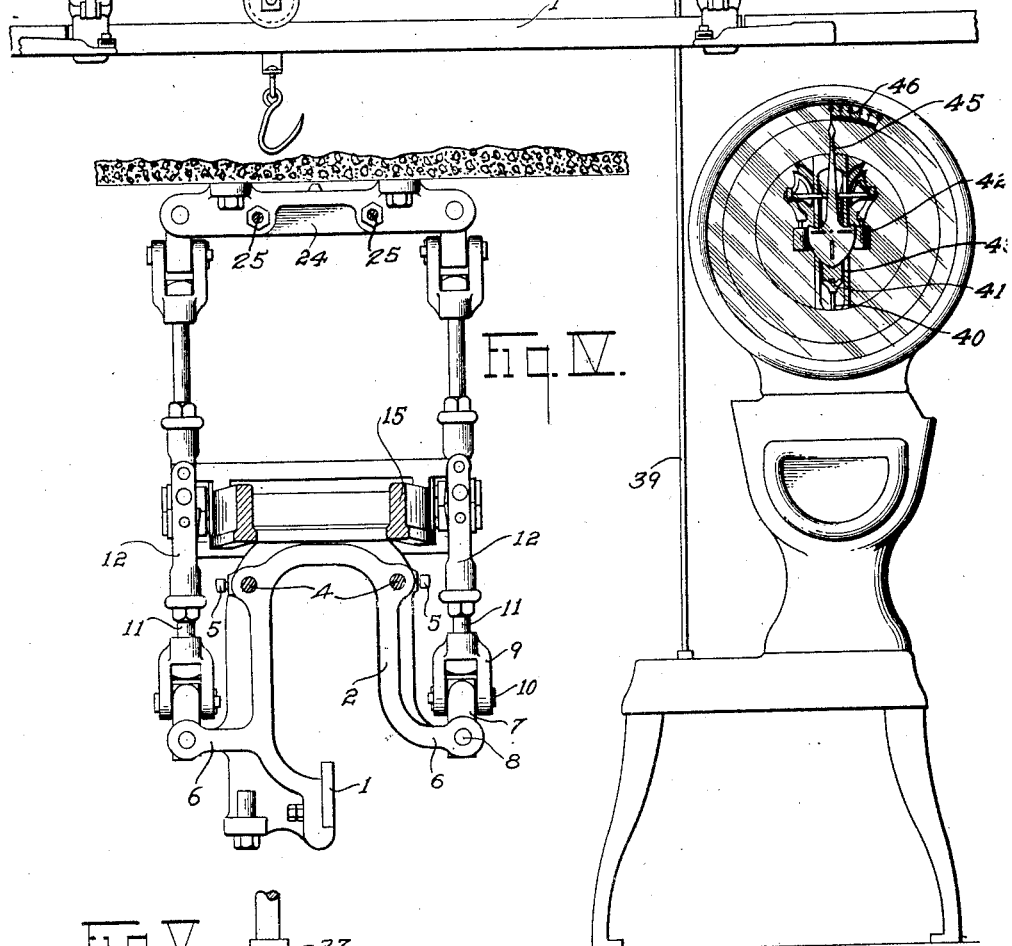
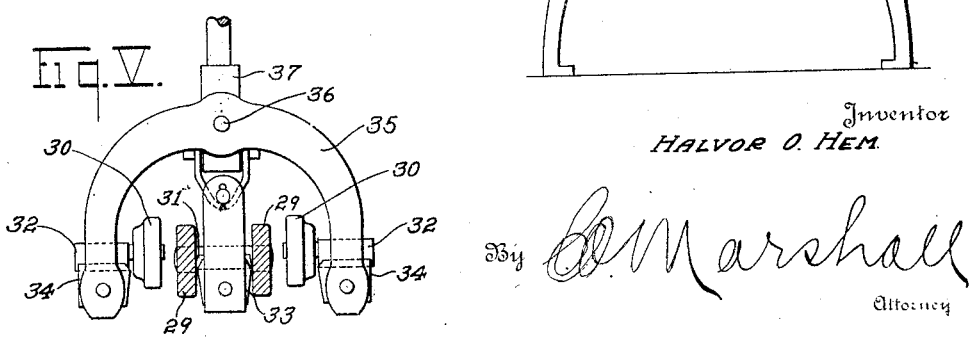
Inventor
HALVOR O. HEM.
By E. M. Marshall
Attorney Feb. 5, 1929.  1,701,039
H. O. HEM
OVERHEAD TRACK SCALE
Filed Feb. 14, 1923.  2 Sheets-Sheet 2
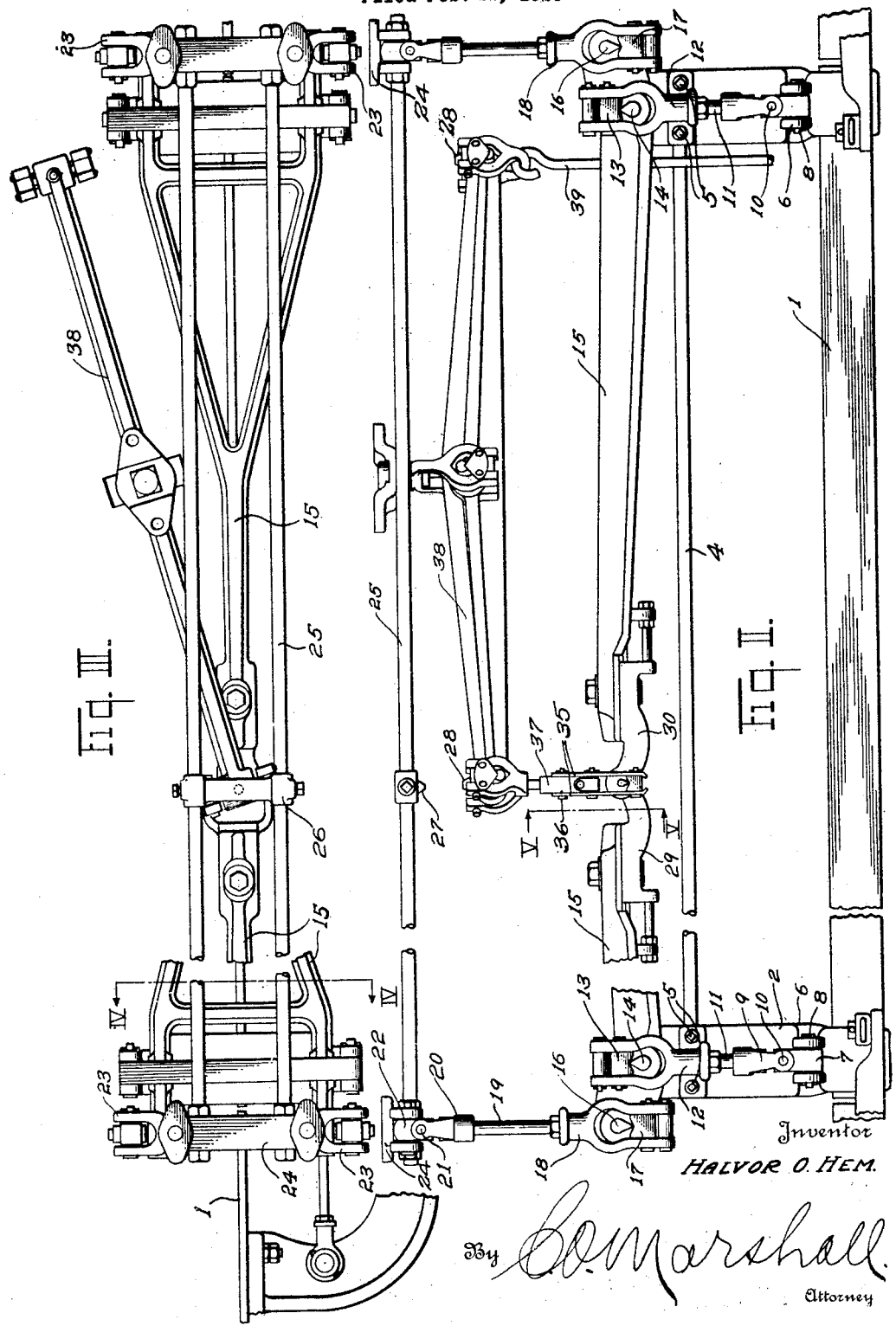
Inventor
HALVOR O. HEM.
By C. O. Marshall
Attorney Patented Feb. 5, 1929.

1,701,039

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

OVERHEAD TRACK SCALE.

Application filed February 14, 1923. Serial No. 618,893.

This invention relates to improvements in weighing scales, and more particularly to scales of the type known as overhead track scales such as are extensively employed in abbattoirs and other parts of packing plants and wherever it is desired to weigh commodities without removing them from overhead conveying tracks. The commodity-receiver employed in scales of this type is a section of the track which is suspended from a system of overhead levers that are in turn connected to some suitable load-counterbalancing and indicating mechanism.

One of the principal objects of this invention is the provision of lever mechanism in which corresponding parts are of duplicate construction and, therefore, interchangeable.

Another object is to provide lever mechanism for an overhead track scale which may be completely assembled before being shipped from the factory.

Another object is the provision of means to prevent distortion of the track supporting brackets when a load is moved onto the track.

Still another object is to provide universal suspension means for the lever mechanism.

Other objects and advantages will be apparent from the following description, in which reference is had to the accompanying drawings illustrating a preferred embodiment of my invention and wherein similar reference numerals designate similar parts throughout the several views.

In the drawings:—

Figure I is an elevational view of a track scale embodying my invention, showing the lever mechanism connected to an automatic load-counterbalancing and indicating device;

Figure II is an enlarged elevational view of the overhead lever mechanism, parts being broken out;

Figure III is a top plan view of the lever mechanism, parts being broken out;

Figure IV is an enlarged fragmentary sectional elevation taken substantially on the line IV—IV of Figure III; and Figure V is an enlarged fragmentary sectional elevation taken substantially on the line V—V of Figure II.

Referring to the drawings in detail, I have shown my invention in combination with an automatic load-counterbalancing and indicating device of the type employing a pair of oppositely-swinging pendulums to counterbalance the variable loads, and the lever mechanism of my invention has proven to be well adapted for use with such automatic load-counterbalancing and indicating device, but it is to be understood that any preferred type of load-counterbalancing device may be used in connection with my invention without departing therefrom, the particular automatic load-counterbalancing device illustrated being merely exemplary.

In carrying out my invention a section of an overhead track 1 is supported by a pair of brackets 2 and 3 (shown in Figs. II and IV) to which it is fixedly secured at its ends. The brackets 2 and 3 are rigidly connected by means of rods 4 which extend through openings in the brackets and are secured in place by means of set screws 5. The track section 1, the brackets 2 and 3 and the rods 4 thus form a rigid frame not subject to distortion when loads are rolled upon the track section. Integral with each bracket and extending in opposite directions therefrom are pairs of ears 6 (see Figs. II and IV), a block 7 being pivotally mounted between the ears of each pair by means of a pintle 8. Each of the blocks 7 is also pivotally connected to a stirrup 9, the pintle 10 which connects the block 7 to the stirrup 9 lying at right angles to the pintle 8 so that a universal connection is formed between the bracket 2 and the stirrup 9.

Short rods 11 connect the stirrups 9 to upturned stirrups 12 which are provided with bearing blocks 13 that rest upon the load pivots 14 of main levers 15.

The fulcrum pivots 16 of the levers 15 rest upon bearing blocks 17 which are supported by the stirrups 18. Short shafts 19 connect the stirrups 18 to upturned stirrups 20 which are pivotally connected by means of pintles 21 to blocks 22 pivotally mounted between furcations 23 that project laterally from supporting brackets 24.

The brackets 24, which are adapted to be secured to the ceiling of the building in which the scale is installed, are rigidly connected and held in proper spaced relation by means of a pair of rods 25 (see Fig. III) which pass through apertures in the brackets and are secured in position by nuts. The brackets and rods thus form a frame, which may be assembled at the factory, from which the lever mechanism is universally suspended, so that the parts are freely movable and the suspension members may readily swing to positions in which the connections are plumb. Mounted upon the rods 25 is a member 26 which may be fixed in adjusted position by any suitable means, such as set screws, and projecting downwardly from the center of the member 26 is a small teat 27 which co-operates with a teat 28 in a manner that will later appear.

The nose ends of the levers 15 are provided with ways upon which nose irons 29 and 30 (see Fig. II) are mounted for slidable adjustment. The pivots 31 and 32 (see Fig. V) carried respectively by the nose irons 29 and 30 rest in V-grooved bearings 33 and 34. The bearings 34 are carried by a pair of U-shaped plates 35 which are connected together by pintles passing through the bearing pieces 34 and also by a pin 36 which passes through the end of a vertical link 37. The bearing 33 which supports the nose pivot 31 is universally supported from the end of the link 37, with its V groove lying substantially in alignment with the V grooves of the bearings 34.

It is apparent that with the construction described above many of the parts of the lever mechanism may be duplicates and, therefore, interchangeable. It is also apparent that while the levers 15 move in arcs about different centers during weighing operations, the center connection permits such movement without setting up conditions that affect the accuracy of the scale.

The link 37 of the center connection is pivotally connected to one end of a lever 38, which may be of any desired multiplication but which in this instance is shown as an even arm lever fulcrumed upon a bracket adapted to be attached to the ceiling or other overhead support that carries the scale. The ends of the lever 38 are provided with small upwardly-projecting teats 28. When the fulcrum bracket of the lever 38 is fixed in place, the teat 28 should be located directly beneath the teat 27 on the member 26. The opposite end of the lever 38 is connected by means of a rod 39 to the automatic load-counterbalancing and indicating device.

The rods 39 and 40 (see Fig. I) are connected to opposite ends of an even arm lever which is concealed within the housing of the automatic load-counterbalancing and indicating device. A yoke 41 is secured to the upper end of the rod 40 and a pair of ribbons 43 connects the upper end of the rod 40 to load-counterbalancing pendulums 42. The pendulum mechanism illustrated is of the type shown in my co-pending application Ser. No. 433,919, filed December 29, 1920, and, since my present invention does not reside in the pendulum mechanism per se, I shall not describe it in detail.

When a load is applied to the track section 1, the force exerted by the weight of the load is transmitted through the brackets 2 and 3 and the links 11 to the load pivots of the levers 15. The nose pivots of the levers are thus moved downwardly, the lever 38 is swung upon its fulcrum, and an upward pull is exerted upon the rod 39. The upward pull upon the rod 39 is transmitted as a downward pull to the rod 40 and the ribbons 43, and the pendulums 42 are thereby swung upwardly and outwardly to positions in which the load on the "live" section 1 of the overhead track is counterbalanced. The weight of the load so counterbalanced is indicated by the hand 45, which is suitably connected to the pendulum mechanism and is thus caused to move over the chart 46.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a weighing scale, in combination, a frame adapted to be secured to an overhead support, lever mechanism comprising a plurality of levers, means for universally suspending said lever mechanism from said frame, a commodity-receiver consisting of a section of conveyor track, and means for universally suspending each end of said section of conveyor track from a separate lever of said lever mechanism.

2. In a weighing scale, in combination, a frame adapted to be secured to an overhead support, a pair of link connections universally connected to said frame and depending therefrom, fulcrum bearings supported by said link connections, a pair of weighing levers fulcrumed in said fulcrum bearings, a commodity-receiver and means whereby said commodity-receiver is supported by said weighing levers and connected thereto.

3. In a weighing scale, in combination, a frame adapted to be secured to an overhead support, a pair of weighing levers lying beneath said frame and supported therefrom, each of said weighing levers having a pair of laterally spaced aligned load pivots, bearings resting upon said load pivots, links depending from said bearings, means for holding the upper ends of said links in proper spaced relation, and a frame universally connected to the lower ends of said links, said frame including a section of conveyor track.

4. In a weighing scale, in combination, weighing levers having load pivots, links depending from said weighing levers, and a frame connected to said links, said frame comprising a section of conveyor track, brackets secured to said section of track adjacent its ends, and a pair of rods lying above the level of said track and rigidly connecting said brackets.

5. In a weighing scale, in combination, a supporting frame consisting of a pair of supporting brackets and means rigidly connecting said supporting brackets, links universally connected to said supporting frame and depending therefrom, means for holding the lower ends of said links in proper spaced relation, bearings supported by said links, weighing levers fulcrumed on said bearings, said weighing levers having load pivots, a commodity-receiver consisting of a section of conveyor track lying beneath said levers, and means connecting said commodity-receiver to said levers.

6. In a weighing scale, in combination, a supporting frame consisting of a pair of supporting brackets and means rigidly connecting said supporting brackets, links universally connected to said supporting frame and depending therefrom, means for holding the lower ends of said links in proper spaced relation, bearings supported by said links, weighing levers fulcrumed on said bearings, said weighing levers having load pivots, links depending from said load pivots, means for holding the upper ends of said links in proper spaced relation, and a frame universally connected to the lower ends of said links, said frame comprising a pair of brackets, members rigidly connecting said brackets, and a section of conveyor track rigidly secured to said brackets and forming a commodity-receiver.

7. In a weighing scale, in combination, a frame adapted to be secured to an overhead support, said frame having a marker intermediate its ends, a pair of weighing levers suspended from said frame, a third lever having one of its ends connected to said weighing levers, said third lever having a marker adapted to be positioned directly beneath the marker on said frame, a load-counterbalancing device, and means connecting said third lever and said load-counterbalancing device.

HALVOR O. HEM.